(No Model.)
J. W. SMITH.
CASTER.
No. 318,811. Patented May 26, 1885.
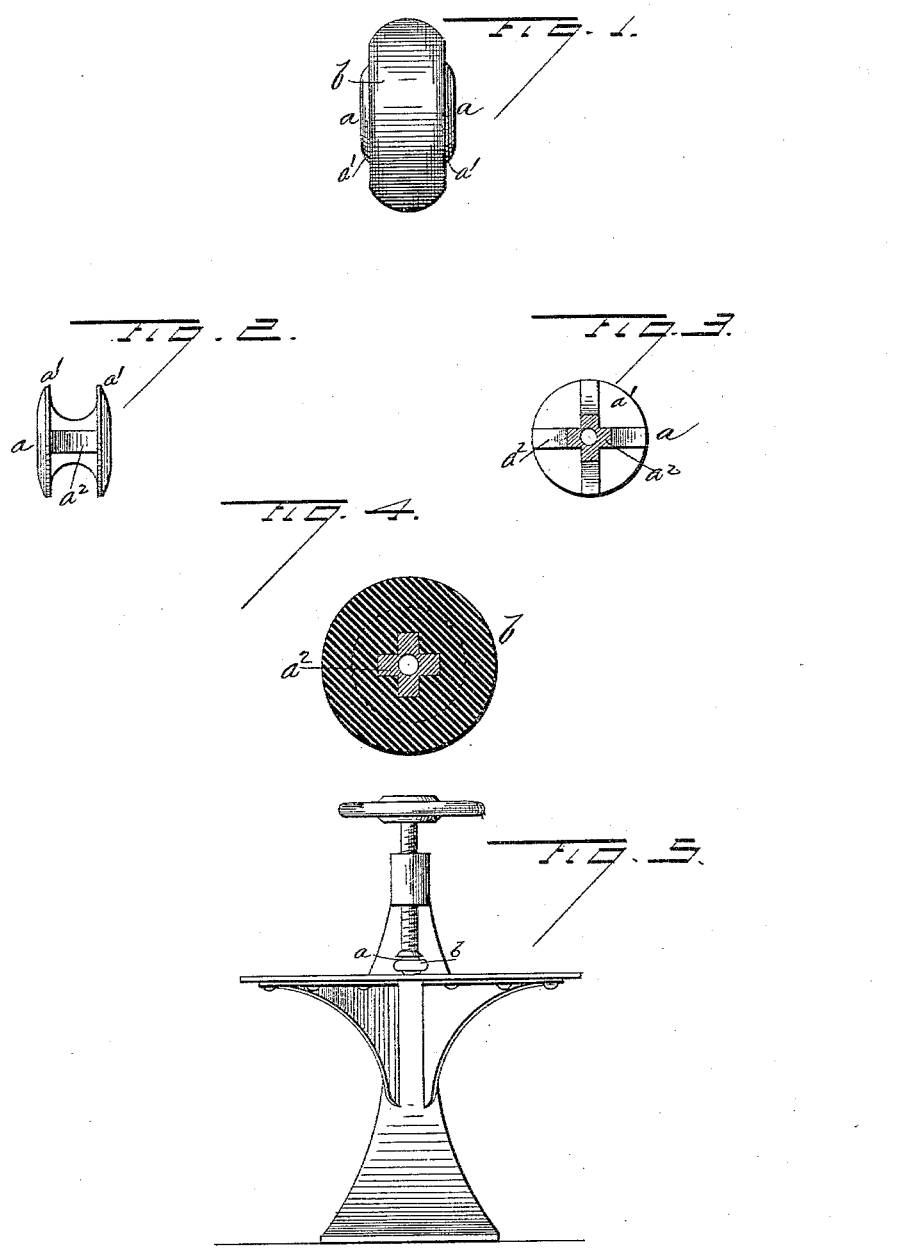

United States Patent Office.

JOHN W. SMITH, OF CHICAGO, ILLINOIS.

CASTER.

SPECIFICATION forming part of Letters Patent No. 318,811, dated May 26, 1885.

Application filed April 21, 1884. (No model.)

*To all whom it may concern:*

Be it known that I, JOHN W. SMITH, a citizen of the United States, residing at Chicago, in the county of Cook and State of Illinois, have invented certain new and useful Improvements in Caster-Wheels, of which the following is a specification, to wit:

This invention relates to an improvement in caster-wheels; and it consists in certain peculiarities in the construction and arrangement of the same, substantially as will be hereinafter more fully set forth and claimed.

In order to enable others skilled in the art to which my invention appertains to make and use the same, I will now proceed to describe its construction, referring to the accompanying drawings, in which—

Figure 1 is a view of the wheel; Figs. 2 and 3, of its hub; Fig. 4, a section of the wheel, and Fig. 5 a view of a press with one of the wheels under operation.

$a$ represents a solid metal hub cast with flanges $a'\ a'$. This hub is, between the flanges, formed with a number of transverse ribs, $a^2$, as shown in Figs. 2 and 3, and upon this hub, between the flanges, is molded a solid rubber tire, $b$, as shown.

Rubber caster-wheels are usually made either with hubs having small flanges, over which the rubber is sprung, or with one of said flanges removable. In the former case the rubber is liable to be twisted out of its seat, and in the latter the hub is weakened and the rubber not tightly held.

I first cast the hub $a$ solid with deep flanges and the transverse ribs between them. This is then placed in a mold and the rubber tire molded upon it, which not only enables me to use deeper and better protecting-flanges, but the rubber is molded closely around the ribbed center of the hub, and is thereby prevented from twisting or turning upon it. After the rubber is thus molded the wheel is placed in a press, as shown in Fig. 5, and the flanges of the hub are compressed upon the rubber to more tightly secure it in place.

Having thus fully described my invention, what I claim as new, and desire to secure by Letters Patent, is—

1. The process of forming caster-wheels by first forming the flanged and ribbed hub, then placing the tire upon it, and finally compressing the flanges upon the tire, substantially as and for the purpose set forth.

2. As a new article of manufacture, a caster-wheel having its hub formed with side flanges and transverse ribs, and its tire molded thereon and retained by upsetting upon it the flanges, as described, substantially as shown and described.

In testimony whereof I affix my signature in presence of two witnesses.

JOHN W. SMITH.

Witnesses:
W. C. MCARTHUR,
CHAS. KRESSMANN.